W. WHITCOMB.
Bee Hive.
No. 4,763.
Patented Sept. 19, 1846.
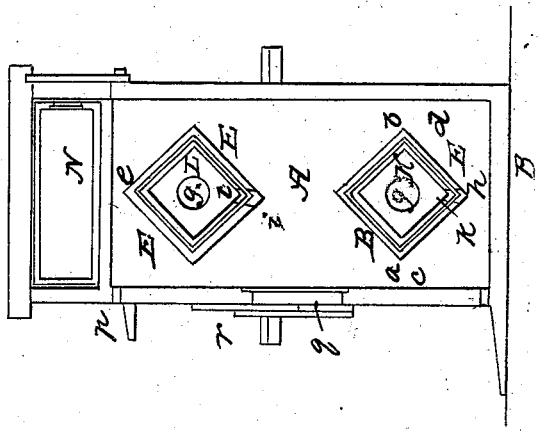
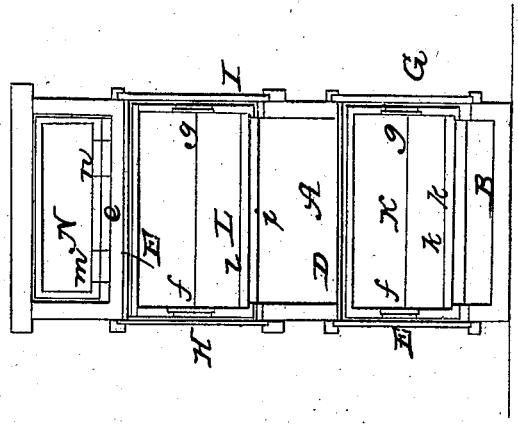
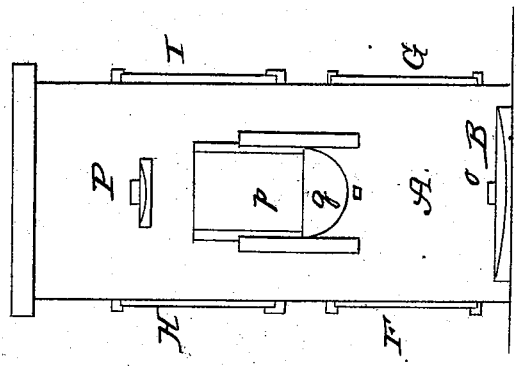

UNITED STATES PATENT OFFICE.

WILLIAM WHITCOMB, OF GRAFTON, VERMONT.

BEEHIVE.

Specification of Letters Patent No. 4,763, dated September 19, 1846.

*To all whom it may concern:*

Be it known that I, WILLIAM WHITCOMB, of Grafton, in the county of Windham and State of Vermont, have invented a new and useful Improvement in Beehives; and I do hereby declare that the nature of the same is fully set forth in the following description and accompanying drawings, letters, figures, and references thereof.

Of the said drawings Figure 1 represents a front elevation, Fig. 2 a central vertical and transverse section, and Fig. 3 a central vertical and longitudinal section of my improved bee hive.

The peculiar nature of my improvement consists in the manner in which I arrange the cases of the drawers of the hive in the same, the said arrangement although very simple as it may appear enabling me to obtain very great advantages in the management and operations of the bees.

In the aforementioned figures of the drawings A represents the main chamber of the hive which as I now build it, I make twelve inches square in the cleat in its horizontal section, and twenty eight inches high.

Just above the bottom board B or at one inch above it. I insert through two opposite sides of the chamber a case D seven inches square in section. I arrange the said case in such manner that a plane passing diagonally through its corners (*a b*) shall be parallel to the bottom board B. This will leave spaces *c d* of about one inch in width between the corners (*a b*) and the adjacent sides of the chamber of the hive. In the upper part of the main chamber A of the hive I insert another and similar case E and in a similar manner with the exception that I place its upper corner *e* at a distance of one half an inch from the top of the chamber. Each of the cases D or E I leave entirely open at its two opposite ends, and cover by sliding doors F G or H I applied to the exterior of the main chamber. The two cases are thus placed in the extremities of the main chamber and at such distance apart as to leave a sufficient room between them for a deposit of honey to supply the bees during the winter season. Into each of the said cases, I insert a rectangular box K or L of about six inches square in section, and as long as the hive is wide, plates of glass or small windows *f g* being applied or affixed in its respective ends, the slides F G or H I serving when closed to cover these windows and exclude the light from the interior of the boxes. Through the lower part of each case D or E I make a long slit or passage *h* or *i* as seen in Figs. 2, 3, the same being of sufficient width to allow the bees to pass through it. Directly over the said passages and through the respective boxes, I make corresponding slits *k l* so as to permit the bees to pass through them and enter the boxes.

In the drawings I have represented another chamber disposed over the main chamber A and having a drawer or box N inserted and arranged in it and made to communicate with the main chamber in the ordinary manner, *m n* denoting the passages or communications between the same.

The bees enter the hive through proper openings *o p* made at top and bottom as seen in Fig. 3. A glass window *q* having a slide or shutter *r* is disposed in the side of the main chamber so as to enable a person at any time to inspect the interior thereof.

In the construction of the hive of the dimensions as above set forth I have endeavored to maintain due proportions of its parts to insure all that is desirable in the management and operations of bees. When the apiarian chooses to have the bees swarm of themselves they will do so from this hive, but were it much larger they would never swarm. Again were it much smaller a division of the colony within would leave the occupants so weak and feeble in numbers as to be nearly or quite worthless. Again during the season of swarming and when the brood combs are in a proper state I remove one box or both of the boxes and insert them into an empty hive of the same dimensions, thus readily and at once saving the time of watching the bees during the period of swarming. By this process I divide them equally and much earlier than they would do of their own accord, while the natural mode of swarming often seriously injures the old colony they being left so few in number as to become an easy prey to the bee moth or bee robber, or on the return of winter be unable to maintain a proper atmosphere or heat within the hive.

The peculiar manner in which the cases for the boxes are arranged with respect to the sides of the hive, that is with their diagonal planes in horizontal and vertical positions as denoted in the drawings, leaves such passages between the angles of the cases and the contiguous sides of the hives, as are exceedingly agreeable to the bees and much more so than were the cases arranged with two of their opposite sides in vertical planes, as they would then present long and narrow passages for the bees to pass through which are not only liable to prevent the free and agreeable ingress and egress of the bees, but offer greater facilities for the admission of cold air within the hive.

The improved manner of arranging the cases gives the bees a stronger defense against the assaults of the bee robber or bee moth, besides it offers a better security to the combs between them both as respects frost or heat besides many other advantages, which will be apparent to those who understand the management of bees.

I do not claim the employment (in a hive) of drawers or boxes and cases to receive them as I am well aware that such are old and common devices, but That which I do claim is—

My improved manner of arranging each box and its case in the main chamber of the hive, as above described, that is to say the so disposing them therein, that two diagonal planes passing through their corners shall be respectively parallel to the bottom and sides of the hive substantially as hereinbefore specified.

In testimony whereof I have hereto set my signature this eleventh day of April A. D. 1846.

WILLIAM WHITCOMB.

Witnesses:
  B. McH. BRIDGMAN,
  M. F. BRIDGMAN.